United States Patent
Chen et al.

(10) Patent No.: US 6,233,100 B1
(45) Date of Patent: May 15, 2001

(54) ULTRA-WIDE FIELD OF VIEW CONCENTRIC SCANNING SENSOR SYSTEM

(75) Inventors: Chungte W. Chen, Irvine; J. Steve Anderson, Santa Monica, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/413,688

(22) Filed: Oct. 7, 1999

(51) Int. Cl.[7] .......................... G02B 17/00; G02B 26/08; H01J 40/14
(52) U.S. Cl. .......................... 359/727; 359/205; 359/210; 359/212; 359/223; 250/214 VT
(58) Field of Search .................. 359/196, 197, 359/205, 209, 210, 212, 213, 214, 215, 225, 223, 664, 725, 726, 727, 728, 733, 735, 753; 250/207, 214 VT

(56) References Cited

U.S. PATENT DOCUMENTS 5,274,235 * 12/1993 Taylor ........................... 250/332

* cited by examiner

*Primary Examiner*—Georgia Epps
*Assistant Examiner*—David N. Spector
(74) *Attorney, Agent, or Firm*—Colin M. Raufer; Leonard A. Alkov; Glenn H. Lenzen, Jr.

(57) ABSTRACT

A very compact, high numerical aperture, high resolution, ultra-wide field of view concentric scanning optical sensor. The concentric scanning optical sensor includes a scanning half ball lens having a flat reflective rear surface, outer and inner shell lenses, and a linear focal surface array. The outer shell lens and linear inner shell lens are concentrically disposed about the center of the scanning half ball lens. The linear focal surface array is disposed along a focal surface of the inner shell lens. The scanning optical sensor may also use a full spherical ball with multiple reflecting surfaces to allow for multiple facet scanning.

9 Claims, 1 Drawing Sheet

ULTRA-WIDE FIELD OF VIEW CONCENTRIC SCANNING SENSOR SYSTEM

GOVERNMENT RIGHTS

This invention was made with Government support under Contract No. N66001-98C-8622 awarded by the Department of the Navy. The government has certain rights in this invention.

BACKGROUND

The present invention relates generally to scanning electro-optical sensor systems, and more particularly, to ultra-wide field of view concentric scanning electro-optical sensor systems.

Most wide field of view scanning electro-optical systems have either a fisheye lens form or concentric Bouwers system. For a fisheye lens system, the overall length is at least six times the effective focal length (EFL). Consequently, the fisheye lens systems are bulky and heavy. In many cases, aspheric lenses are needed for both aberration and distortion correction. Additionally, the implementation of a scanner near the pupil plane or aperture stop is a challenging task.

Although the Bouwers system is a concentric design form, the overall length is two times the EFL. Additionally, the generic central obscuration characteristics associated with the Bouwers system often limits the F-number and the field of view coverage. Therefore, a scanner near the aperture has to be decentered with respect to the optical axis.

Accordingly, it is an objective of the present invention to provide for ultra-wide field of view concentric scanning electro-optical sensor systems that improve upon conventional fisheye lens and Bouwers type systems.

SUMMARY OF THE INVENTION

To accomplish the above and other objectives, the present invention provides for a very compact, high numerical aperture, high resolution, ultra-wide field of view (FOV) concentric scanning optical sensor. The drawbacks associated with the prior art systems may be overcome by the concentric scanning optical sensor constructed in accordance with the principles of the present invention.

The concentric scanning optical sensor comprises a scanning half ball lens having a flat reflective rear surface, an outer shell lens that is concentrically disposed about the scanning half ball lens, a relatively thin inner shell lens that is concentrically disposed about the scanning half ball lens, and a linear focal surface array that is concentrically disposed about the scanning half ball lens.

The scanning half ball lens is rotated to scan the field of view. The flat surface of the half ball lens may be a reflective Schmidt corrector with generalized aspheric shape. The flat surface of the half ball lens may be a reflective Schmidt corrector with generalized bilateral symmetric aspheric shape. The scanning mechanism may also be a full spherical ball with multiple reflecting surfaces to allow for multiple facet scanning.

The focal surface array may be a curved and concentric with respect to the center of the scanning half ball lens. The focal surface array may be coplanar with detector elements distributed along a ring centered around the optical axis of the sensor. The focal surface array may also include multiple stripes concentric with respect to the center of the half ball lens.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which.

DETAILED DESCRIPTION

Figure 1:
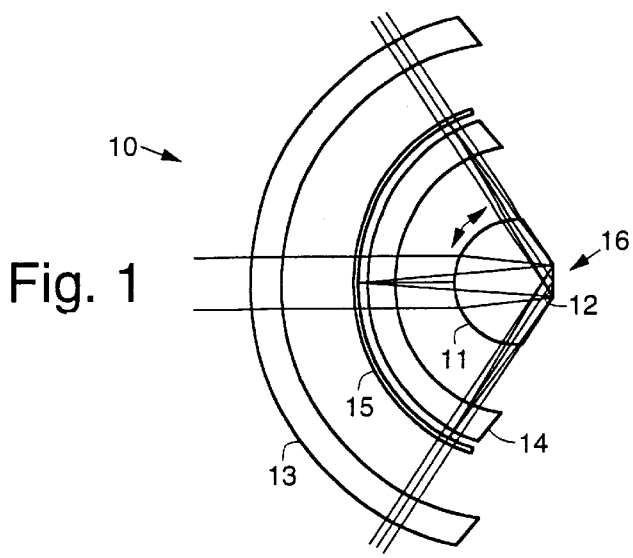
FIG. 1 illustrates a cross-sectional top view of an exemplary very compact, high numerical aperture, high resolution, ultra-wide field of view concentric scanning optical sensor in accordance with the principles of the present invention.
Figure 2:
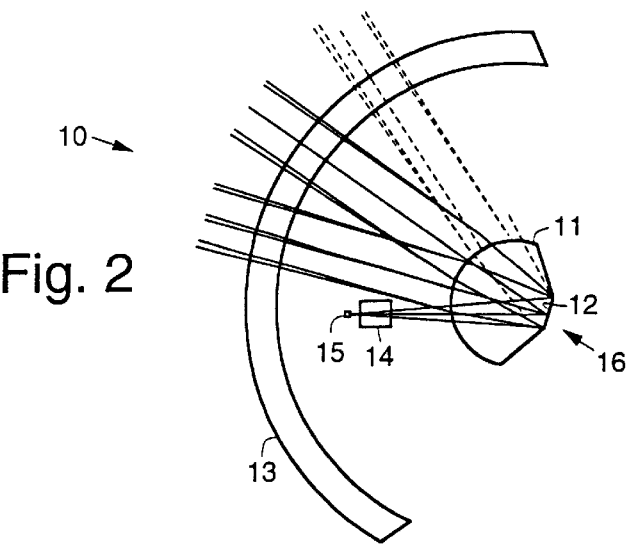
FIG. 2 illustrates a cross-sectional side view of the exemplary sensor shown in FIG. 1.

Referring to the drawing figures, FIG. 1 illustrates a cross-sectional top view of an exemplary very compact, high numerical aperture, high resolution, ultra-wide field of view concentric scanning optical sensor 10 in accordance with the principles of the present invention. FIG. 2 illustrates a cross-sectional side view of the exemplary sensor 10 shown in FIG. 1.

The ultra-wide field of view sensor 10 comprises a rotatable half ball lens 11 having a flat reflective (mirror) surface 12. An outer shell lens 13 is concentrically disposed with respect to the center of the rotatable half ball lens 11. A relatively thin partial ring-like inner shell lens 14 that is concentrically disposed about the center of the scanning half ball lens 11.

A linear focal surface array 15 concentric with a focal surface of the inner shell lens 14. The focal surface array 15 may be either a curved linear array with a center of curvature in the proximity of the aperture, or a linear array arranged in a ring shape concentric with an optical axis of the sensor 10. Thus, the outer shell lens 13, inner shell lens 14 and linear focal surface array 15 are concentrically disposed with respect to the center of the rotatable half ball lens 11.

Rotation of the rotatable half ball lens 11 is illustrated in FIG. 1 which rotates about an axis through the center of the ball in the plane of the drawing. In FIG. 2, the rotatable half ball lens 11 rotates about an axis through the center of the ball into and out of the drawing.

In operation, incoming radiation derived from an image scene passes through the lens shell outer 13, enters the half ball lens 11, and is reflected by the flat rear reflective surface 12 of the half ball lens 11. The radiation reflected by the reflective surface 12 of the half ball lens 11 passes through the inner shell lens 14 and is focused on the focal surface array 15.

An aperture stop 16 is located at the reflective (mirror) surface 12 of the half ball lens 11. Since each optical element in the sensor 10 is concentric with respect to the center of the aperture stop 16, the image quality is practically identical for every field point. This symmetric principle makes the concentric structure of the concentric scanning optical sensor 10 very simple in terms of both design and fabrication.

To reduce the size of the focal surface array 15, a linear detector array 15 in conjunction with a scanning half ball lens 11 is used to scan the two dimensional field of view. The scanning process is accomplished by rotating the half ball lens 11 to scan the field of view.

The linear focal surface array 15 can have a number of different structures. The linear focal surface array 15 may be a curved linear focal surface array 15 that concentrically disposed with respect to the aperture stop 16 (or the center of the half ball lens 11). The linear focal surface array 15 may be a flat linear focal surface array 15 with detector elements distributed on an arc that is concentric with respect to, or centered around, the optical axis of the sensor 10. The linear focal surface array 15 may also use any spherical arrangement of the detector elements of the focal surface array 15. For example, the focal surface array 15 may be comprised of multiple stripes that are concentrically disposed with respect to the center of the half ball lens 11.

The flat mirror surface 12 of the half ball lens 11 may comprise a reflective Schmidt plate, or reflective Schmidt corrector to provide for residual aberration correction. The Schmidt plate may have a generalized aspheric shape or a generalized bilateral symmetric shape. This additional degree of freedom in spherical aberration and oblique spherical aberration correction allows more choices in glass materials for both the half ball lens 11 and the outer and inner shell lenses 13, 14.

The sensor 10 has an overall length approximately equal to its effective focal length. More importantly, the optical elements are spherical in shape, and the image quality is practically diffraction-limited across the entire field of view.

The field of view coverage of the concentric scanning optical sensor 10 may be as large as up to 180 degrees. Notwithstanding this, the volume of the sensor 10 is at least 20 times smaller than that of a corresponding fisheye lens. The large field of view capability is ideal for many target acquisition sensor applications.

The concentric scanning optical sensor 10 has broad applications for use in sensor systems manufactured by the assignee of the present invention. The high numerical aperture, wide field of view and ultra-compact package provided by the present sensor 10 is particularly suitable for spaceborne and airborne acquisition sensor applications.

Figure 3:
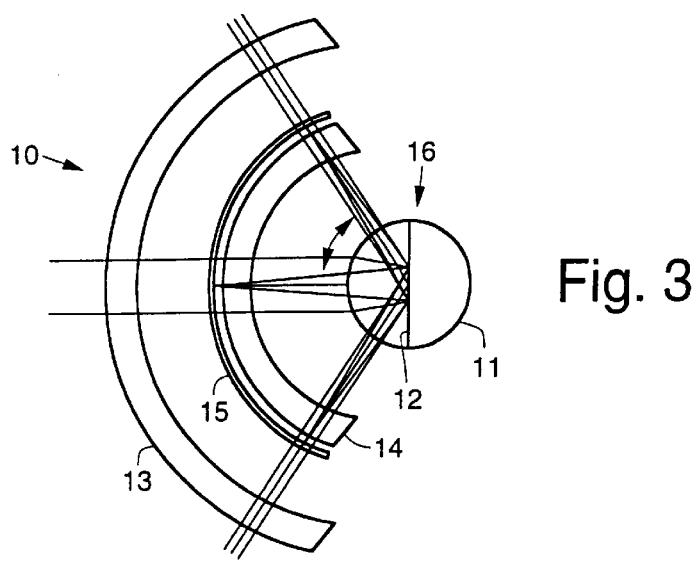
FIG. 3 illustrates a cross-sectional top view of a second exemplary scanning optical sensor in accordance with the principles of the present invention.

More than one reflective facet may be used in the sensor 10 if the scanning ball is made spherical to improve the scanning duty cycle. FIG. 3 illustrates a cross-sectional top view of a second exemplary scanning optical sensor 10 in accordance with the principles of the present invention. The sensor 10 shown in FIG. 3 employs two half ball lenses 11 combined into a full sperical ball lens 11a.

Thus, ultra-wide field of view concentric scanning electro-optical sensor systems have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An ultra-wide field concentric scanning sensor comprising:
   a rotatable half ball lens having a flat reflective surface;
   a outer shell lens concentrically disposed with respect to the half ball lens;
   a linear inner shell lens concentrically disposed with respect to the half ball lens; and
   a linear focal surface array disposed along a focal surface of the inner shell lens.

2. The sensor recited in claim 1 wherein the focal surface array is curved.

3. The sensor recited in claim 1 wherein the half ball lens is rotatable to scan the field of view.

4. The sensor recited in claim 1 wherein the flat surface of the half ball lens is a reflective Schmidt corrector with generalized aspheric shape.

5. The sensor recited in claim 1 wherein the flat surface of the half ball lens is a reflective Schmidt corrector with generalized bilateral symmetric aspheric shape.

6. The sensor recited in claim 1 wherein the focal surface array is curved and concentric with respect to the center of the half ball lens.

7. The sensor recited in claim 1 wherein the focal surface array has detector elements distributed along a ring centered around an optical axis of the sensor.

8. The sensor recited in claim 1 wherein the focal surface array comprises multiple stripes that are concentric with respect to the center of the half ball lens.

9. The sensor recited in claim 1 further comprising:
   a second rotatable half ball lens having a flat reflective surface disposed adjacent to the rotatable half ball lens to form a full ball lens.

* * * * *